(12) United States Patent
Truskovsky et al.

(10) Patent No.: US 11,265,159 B1
(45) Date of Patent: Mar. 1, 2022

(54) DETERMINING UPGRADABILITY SCORES AND IDENTIFYING REMEDIAL SECURITY MEASURES IN A COMPUTING ENVIRONMENT

(71) Applicant: ISARA Corporation, Waterloo (CA)

(72) Inventors: Alexander Truskovsky, Waterloo (CA); Robert Williams, Milton (CA); Alan Panezic, San Mateo, CA (US); Martin Laforest, Kitchener (CA)

(73) Assignee: ISARA Corporation, Waterloo (CA)

( * ) Notice: Subject to any disclaimer, the term of this patent is extended or adjusted under 35 U.S.C. 154(b) by 0 days.

(21) Appl. No.: 17/145,959

(22) Filed: Jan. 11, 2021

(51) Int. Cl.
*H04L 9/08* (2006.01)
*G06F 11/36* (2006.01)
*G06F 8/65* (2018.01)

(52) U.S. Cl.
CPC .............. *H04L 9/0861* (2013.01); *G06F 8/65* (2013.01); *G06F 11/3688* (2013.01); *H04L 9/0852* (2013.01)

(58) Field of Classification Search
CPC ....... H04L 9/0861; H04L 9/0852; G06F 8/65; G06F 11/3688
See application file for complete search history.

(56) References Cited

U.S. PATENT DOCUMENTS

| | | | |
|---|---|---|---|
| 9,660,978 B1 | 5/2017 | Truskovsky et al. | |
| 9,794,249 B1 | 10/2017 | Truskovsky et al. | |
| 10,228,932 B2* | 3/2019 | Ozdemir | G06F 8/658 |
| 10,425,401 B1 | 9/2019 | Pecen et al. | |
| 10,841,295 B1 | 11/2020 | Pecen et al. | |
| 2002/0108041 A1 | 8/2002 | Watanabe et al. | |
| 2003/0191730 A1* | 10/2003 | Adkins | G06N 5/04 706/47 |
| 2003/0221189 A1* | 11/2003 | Birum | H04L 67/20 717/170 |

(Continued)

OTHER PUBLICATIONS

Chen, et al., "Report on Post-Quantum Cryptography", National Institute of Standards and Technology (NIST), Apr. 2016, 15 pgs.

(Continued)

*Primary Examiner* — Robert B Leung
*Assistant Examiner* — Bruce S Ashley
(74) *Attorney, Agent, or Firm* — Henry Patent Law Firm PLLC

(57) ABSTRACT

In a general aspect, upgradability scores are determined, and remedial security measures are identified in a computing environment. The computing environment is analyzed to identify computing resources that are eligible to receive a cryptographic security upgrade. Attributes of the computing resources are identified based on communicating with the computing resources. A set of rules, that define upgradability scores as a function of computing resource attributes, is obtained. Sets of intermediate output values are generated for the respective computing resources by applying the set of rules to the identified attributes of the respective computing resources. Upgradability scores are generated for the respective computing resources from the set of intermediate output values for the respective computing resource. Remedial security measures are identified for respective subsets of the computing resources based on the upgradability scores for the respective subsets.

23 Claims, 6 Drawing Sheets

(56) References Cited

U.S. PATENT DOCUMENTS

2003/0229890 A1* 12/2003 Lau ..................... H04L 69/329
                                                      717/168
2020/0244706 A1* 7/2020 Young .............. G06Q 10/06393
2020/0259647 A1* 8/2020 Goncalves ................ H04L 9/30

OTHER PUBLICATIONS

Housley, "Guidelines for Cryptographic Algorithm Agility and Selecting Mandatory-to-lmplement Algorithms", Internet Engineering Task Force (IETF), Request for Comments: 7696, Nov. 2015, 19 pgs.

Steel , "Achieving 'Crypto Agility'", Cryptosense Blog, Cryptography News & Views, Jan. 21, 2019, 4 pgs.

* cited by examiner

FIG. 5

| | Is application upgradeable? (530-1) | How is cryptographic library linked? (530-2) | Is cryptographic library shared with other applications? (530-3) | Is O/S update required to support new cryptographic library? (530-4) | Is O/S upgradable? (530-5) | Are hardware changes required to support new cryptographic library? (530-6) | Upgradability Score (530-7) | Remedial Security Measure (530-8) |
|---|---|---|---|---|---|---|---|---|
| 520-1 | Y | S or D | N | N | Y or N | N | 10 | Only the application itself needs to be tested for compatibility |
| 520-2 | Y | D | Y | N | Y or N | N | 9 | Compatibility testing of all other applications relying on the same cryptographic library |
| 520-3 | Y | S or D | N | Y | Y | N | 8 | O/S upgrade is required, followed by upgrade of the application itself |
| 520-4 | Y | D | Y | Y | Y | N | 7 | O/S upgrade is required, followed by compatibility testing of all other applications relying on the same cryptographic library, followed by upgrade of the application itself |
| 520-5 | Y | S or D | N | Y | Y | Y | 5 | Hardware and O/S upgrades are required, followed by upgrade of the application itself |

| ID | | | | | | | | |
|---|---|---|---|---|---|---|---|---|
| 520-6 | Y | D | Y | Y | Y | Y | 4 | Hardware and O/S upgrades are required, followed by compatibility testing of all other applications relying on the same cryptographic library, followed by upgrade of the application itself |
| 520-7 | Y | NA | NA | NA | Y | Y | 3 | Manufacturer-dependent computing resource (e.g., printer, server); O/S (e.g. firmware) update needs to be obtained from the manufacturer of the computing resource, followed by upgrade of the application itself |
| 520-8 | Y | NA | NA | Y | N | NA | 2 | Application cannot be upgraded; the H/W is capable of QSC and can be upgraded; can use an agent |
| 520-9 | N | NA | NA | NA | NA | NA | 2 | Application cannot be upgraded; the H/W is capable of QSC and can be upgraded; can use an agent |
| 520-10 | Y | NA | NA | NA | Y | NA | 1 | Retire computing resource (e.g., IP Camera) |
| 520-11 | N | NA | NA | NA | N | NA | 1 | Retire computing resource (e.g., deskphone) |
| 520-12 | Y | NA | NA | NA | Y | Y | 1 | Retire computing resource; embedded system in incapable of running QSC |
| 520-13 | Y | NA | NA | Y | N | NA | 1 | Retire computing resource |
| 520-14 | N | NA | NA | NA | NA | NA | 1 | Retire computing resource |

FIG. 5 (cont'd)

DETERMINING UPGRADABILITY SCORES AND IDENTIFYING REMEDIAL SECURITY MEASURES IN A COMPUTING ENVIRONMENT

BACKGROUND

The following description relates to determining upgradability scores and identifying remedial security measures in a computing environment.

Cryptography systems are used to communicate securely over public channels. For example, some cryptosystems provide confidentiality by encrypting messages, and some cryptosystems provide authenticity through digital signatures. Many cryptosystems include protocols that use cryptographic keys. For example, in a public key infrastructure (PKI), the cryptographic keys include public and private keys for each entity, and a certificate authority can issue digital certificates to certify the public keys.

DESCRIPTION OF DRAWINGS

FIG. 5 is a diagram showing an example table illustrating an example set of rules as a function of computing resource attributes.

DETAILED DESCRIPTION

In some aspects of what is described here, to aid with cryptographic migrations, there may be a need to determine the ease of a cryptographic security upgrade to a computing resource and identify remedial security measures for the computing resource, prior to commencing the cryptographic security upgrade. As an illustration, information technology (IT) systems typically encompass thousands of devices. In some aspects of what is described here, the cryptographic security in a computing environment can be improved by determining the upgradability score for a computing resource and identifying remedial security measures for the computing resource based on the upgradability score. In some aspects of what is described here, the upgradability score is determined in an automated manner that provides enterprise systems the ability to prioritize migration of computing resources in a computing environment. In some examples, the number of applications depending on a particular cryptographic library can impact the time it takes to test and deploy updated cryptographic functionality, thereby influencing the upgradability score. As an example, in some aspects of what is described here, the upgradability score for a computing resource is determined by investigating the chain of dependency for the computing resource. In some instances, determining upgradability scores for computing resources and identifying remedial security measures for the computing resource can reduce risks, costs, and delays. For example, in some aspects of what is described here, the upgradability score and remedial security measures can be determined before a cryptographic migration and can enable the automation of specific tasks (e.g., automatic learning of the extent of the dependencies). Additionally, or optionally, in some aspects of what is described here, rules of a particular type are incorporated to improve a technological process, an example being improving the cryptographic security in a computing environment.

Figure 1:
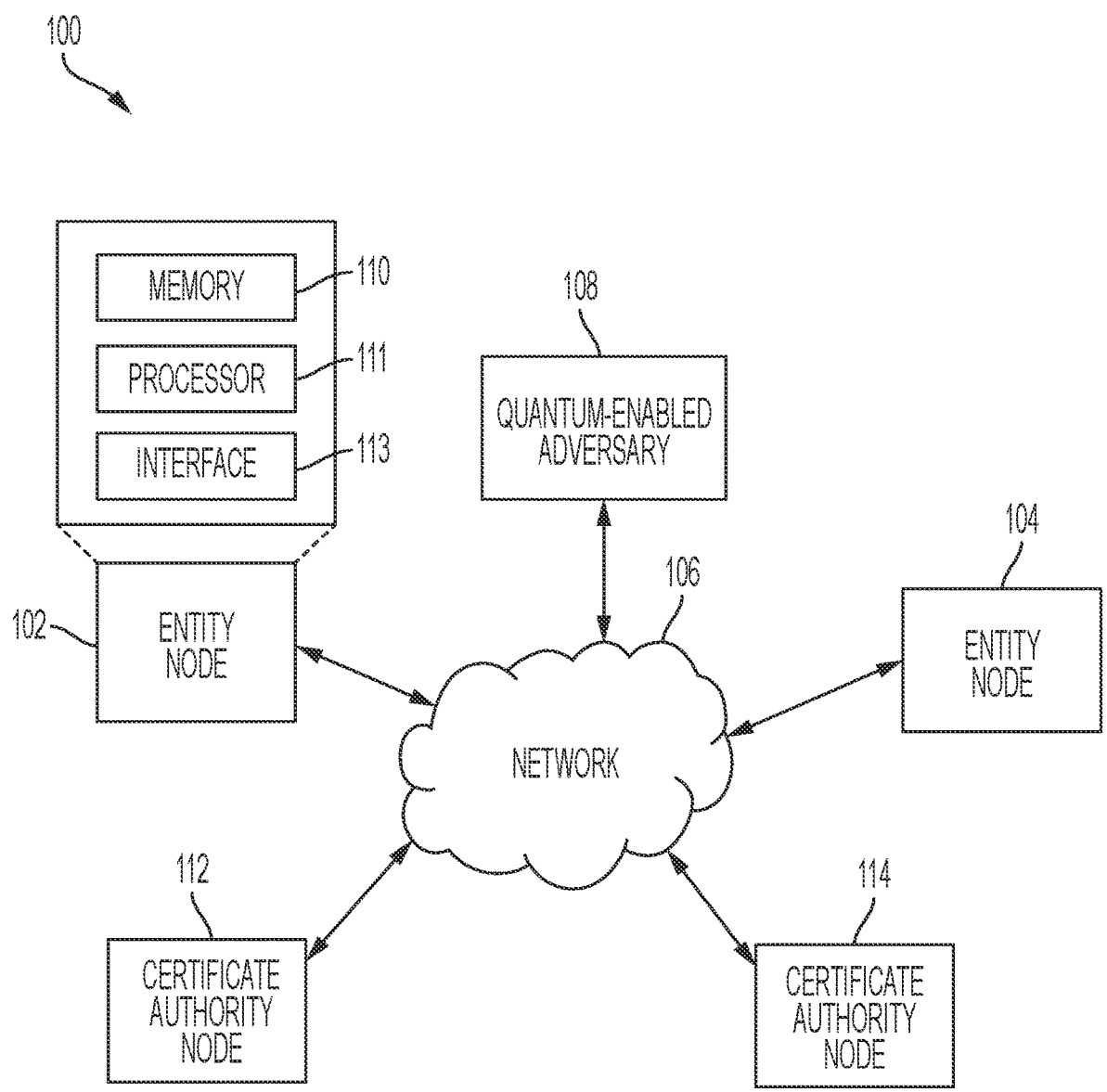
FIG. 1 is a block diagram showing aspects of an example computing environment.

FIG. 1 is a block diagram showing aspects of an example computing environment 100. The example computing environment 100 shown in FIG. 1 includes four nodes—two entity nodes 102, 104, and two certificate authority nodes 112, 114. The nodes use a cryptographic scheme to communicate with each other over a network 106. In the example shown, a quantum-enabled adversary 108 has access to the network 106, information exchanged on the network 106 or both. In some instances, the quantum-enabled adversary can modify information on the network 106. The computing environment 100 may include additional or different features, and the components in a computing environment may be configured to operate as shown in FIG. 1 or in another manner.

In some implementations, nodes in the computing environment 100 may have a server-client relationship. For example, the node 102 can be a server and the node 104 can be its client in a served network, or vice-versa. In some implementations, nodes in the computing environment 100 may have a peer-to-peer relationship. For example, the nodes 102, 104 can be peers in a served network, in a peer-to-peer network or another type of network. Nodes may have another type of relationship in the computing environment 100.

In some instances, the computing environment 100 uses a public key infrastructure (PKI) for cryptographic correspondence. In a typical public key infrastructure (PKI), entities can authenticate each other based on certificates issued by trusted certificate authorities. The entities in the PKI (e.g., users, user accounts, devices or machines, software modules or other types of entities) each have a user identity and a key pair that includes a public key and a private key, and a certificate authority can issue a digital certificate to bind the public key to the entity's user identity.

In some example PKIs, there are two types of digital certificates—certificate authority (CA) certificates and end-entity certificates. A CA certificate can be used to authenticate other certificates. An end-entity certificate can be used to identify an entity (the certificate owner). In the example shown in FIG. 1, each of the entity nodes 102, 104 can be associated with an entity that has an end-entity certificate, and each of the certificate authority nodes 112, 114 can be associated with a certificate authority that has a CA certificate.

Some example PKIs use certificate chains. In a typical certificate chain, a root CA certificate resides at the top of the certificate chain, an end-entity certificate resides at the bottom of the certificate chain, and one or more intermediate CA certificates reside in the middle of the certificate chain (between the root CA certificate and the end-entity certificate). A root CA certificate can be hardcoded and explicitly trusted by the entities in the PKI. An end-entity certificate can be issued to an entity in the PKI and contain the entity's user identity. In some instances, a root certificate authority may issue intermediate CA certificates to subordinate certificate authorities, or a root certificate authority may issue end-entity certificates. In some instances, an intermediate certificate authority may issue intermediate CA certificates to subordinate certificate authorities, or an intermediate certificate authority may issue end-entity certificates. As an example, the certificate authority node 112 in FIG. 1 may be associated with a root certificate authority that has a root CA certificate, and the root certificate authority may issue an intermediate CA certificate to a certificate authority associated with the other certificate authority node 114. The intermediate certificate authority may issue end-entity certificates to entities associated with the entity nodes 102, 104.

In the example shown in FIG. 1, the example entity nodes 102, 104 and the certificate authority nodes 112, 114 each have computational resources (e.g., hardware, software, firmware) that are used to communicate with other nodes. In some implementations, nodes in the computing environment 100 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 111 and an interface 113. Each of the entity nodes 102, 104 and the certificate authority nodes 112, 114 may include the same, additional or different components. The entity nodes 102, 104 and the certificate authority nodes 112, 114 may be configured to operate as shown and described with respect to FIG. 1 or in another manner. In some cases, a single device may operate both as an entity node and as a certificate authority node.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 111.

In the example node 102 shown in FIG. 1, the processor 111 can execute instructions, for example, to generate output data based on data inputs. For example, the processor 111 can run computer programs by executing or interpreting the software, scripts, programs, functions, executables, or other modules stored in the memory 110. The example processor 111 shown in FIG. 1 can include one or more chips or chipsets that include analog circuitry, digital circuitry or a combination thereof. In some cases, the processor 111 includes multiple processor devices such as, for example, one or more main processors and one or more co-processors. For instance, the processor 111 may include a main processor that can delegate certain computational tasks to a cryptographic co-processor, which may be configured to perform the computational tasks more efficiently than the main processor or in parallel with other computational tasks performed by other processor devices. In some instances, the processor 111 coordinates or controls operation of other components of the node 102, such as, for example, user interfaces, communication interfaces, peripheral devices and possibly other components.

In the example node 102 shown in FIG. 1, the interface 113 provides communication with other nodes or devices. In some cases, the interface 113 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 113 includes a wired communication interface (e.g., USB, Ethernet) that can be connected to one or more input/output devices, such as, for example, a keyboard, a pointing device, a scanner, or a networking device such as a switch or router, for example, through a network adapter.

The example network 106 can include all or part of a connector, a data communication network or another type of communication link. For example, the network 106 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The nodes in the example computing environment 100 include secure communication modules (e.g., a Virtual Private Network (VPN), secure web browsing, secure mail, etc.) or other types of system components that use the PKI for authentication and use the related cryptographic keys for identification (e.g., in a digital signature-based zero-knowledge proof or another type of identification mechanism) to establish the trusted identity of participating entities. The security of such authentication and identification mechanisms may rely on one or more cryptography systems ("cryptosystems"). Examples of crypto-systems include a variety of RSA-based cryptosystems, ECC-based cryptosystems, lattice-based cryptosystems and others. A cryptosystem typically defines a set of cryptographic protocols and parameters to be used in the cryptographic protocols.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front-end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptosystems that are believed to be invulnerable to quantum attack. For example, lattice-based cryptosystems have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key of a certificate authority or other entity based on public information).

The example quantum-enabled adversary 108 shown in FIG. 1 can access information exchanged on the network 106. For example, the quantum-enabled adversary 108 may access some or all of the information exchanged between the entity nodes 102, 104 or between an entity node and a certificate authority node. In some instances, the quantum-enabled adversary 108 can directly observe correspondence on the network 106; in some instances, the quantum-enabled adversary 108 indirectly obtains such correspondence, for example, by receiving information observed on the network 106 by another entity or system.

In some implementations, the quantum-enabled adversary 108 can factor integers, compute discrete logarithms or perform other classically-hard computational tasks fast enough to compromise the security of certain cryptography systems. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the computing environment 100 can be migrated (e.g., updated) from an initial cryptosystem to an upgraded cryptosystem, for example, when the initial cryptosystem is (or may eventually be) compromised and no longer secure. In some instances, the upgraded cryptosystem uses the same cryptographic protocols as the initial cryptosystem and uses different parameters in those protocols. For example, an elliptic curve cryptography (ECC)-based cryptosystem can be upgraded to use a new elliptic curve that provides better security. In some instances, the upgraded cryptosystem uses different cryptographic protocols than the initial cryptosystem uses. For example, an ECC-based cryptosystem can be replaced by a lattice-based cryptosystem that provides better security.

In some instances, migrating the computing environment 100 from an initial cryptosystem (e.g., that is outdated or compromised) to another, updated, secure cryptosystem can be tedious and difficult to perform for various reasons. For example, the computing environment 100 may include computing resources (e.g., software resources, hardware resources, or both), and there may be interdependencies among the various computing resources of the computing environment 100, or between the environment 100 and other computing environments that communicate with the environment 100. In such instances, the computing resources of the computing environment 100 may need to receive a cryptographic security update (e.g., migrated from the initial cryptosystem to the updated cryptosystem). As another example, for any computing resource of the computing environment 100, that there may be a chain of dependency that links an application of the computing resource to the computing resource's hardware.

In some instances, the computing resource can be a host device in a networked environment, a software application running on a constrained device, a cryptographic provider, an operating system of a constrained device, or a hardware computing resource that runs an operating system. In some instances, a constrained device is a network-connected device that has resource restrictions or a limited set of functionalities compared to a common desktop computer. Resource restrictions or limited functionalities can include significantly reduced power consumption (e.g., mWatts in a constrained device compared to Watts in a common desktop computer), reduced computation power (e.g., MegaFLOPS in a constrained device compared to TeraFLOPS in a common desktop computer), reduced memory (e.g., KiloBytes in a constrained device compared to GigaBytes in a common desktop computer), or other types of resource restrictions or limited functionalities. In some instances, a constrained device can include a deskphone, IP camera, print server, router, switch, thermostat, wireless access point, door access terminal, wireless television or monitor, industrial equipment controller, or other types of devices.

Figure 2:
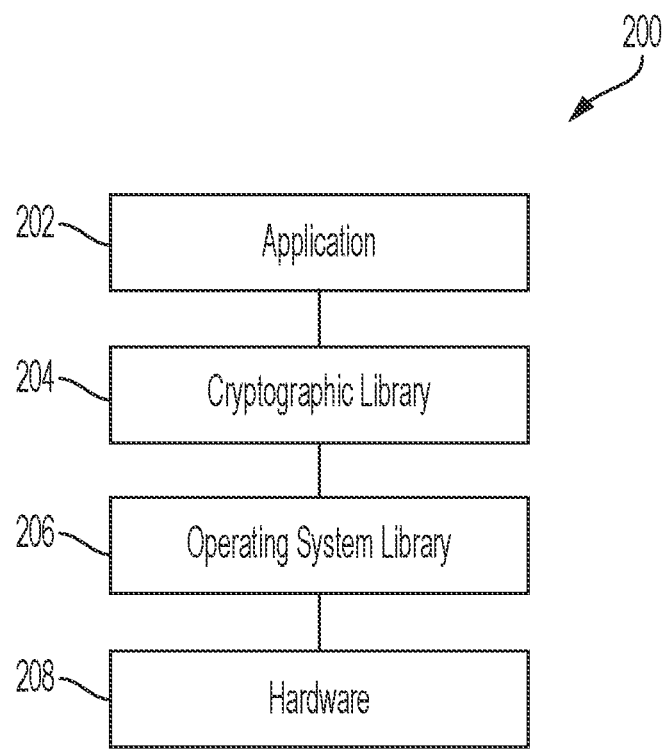
FIG. 2 is a diagram showing an example chain of dependency that links an application running on computing resource to the computing resource's hardware.

FIG. 2 is a diagram showing an example chain of dependency 200 that links an application running on computing resource to the computing resource's hardware. The chain of dependency 200 can have an impact on the ease (or difficulty) of a cryptographic security update. In the example chain of dependency 200, a cryptographic protocol may be embedded within an application 202 running on the computing resource. The application 202 may depend on one or more libraries providing cryptographic functionality (indicated in FIG. 2 as cryptographic library 204). The cryptographic library 204 can be statically or dynamically linked to the application 202. The cryptographic library 204 can depend on one or more operating system (OS) libraries (indicated in FIG. 2 as operating system library 206), which in turn may depend on the computing resource's hardware 208.

To aid with cryptographic migrations, there may be a need to determine the ease of a cryptographic security upgrade to a computing resource and identify remedial security measures for the computing resource, prior to commencing the cryptographic security upgrade.

Figure 3:
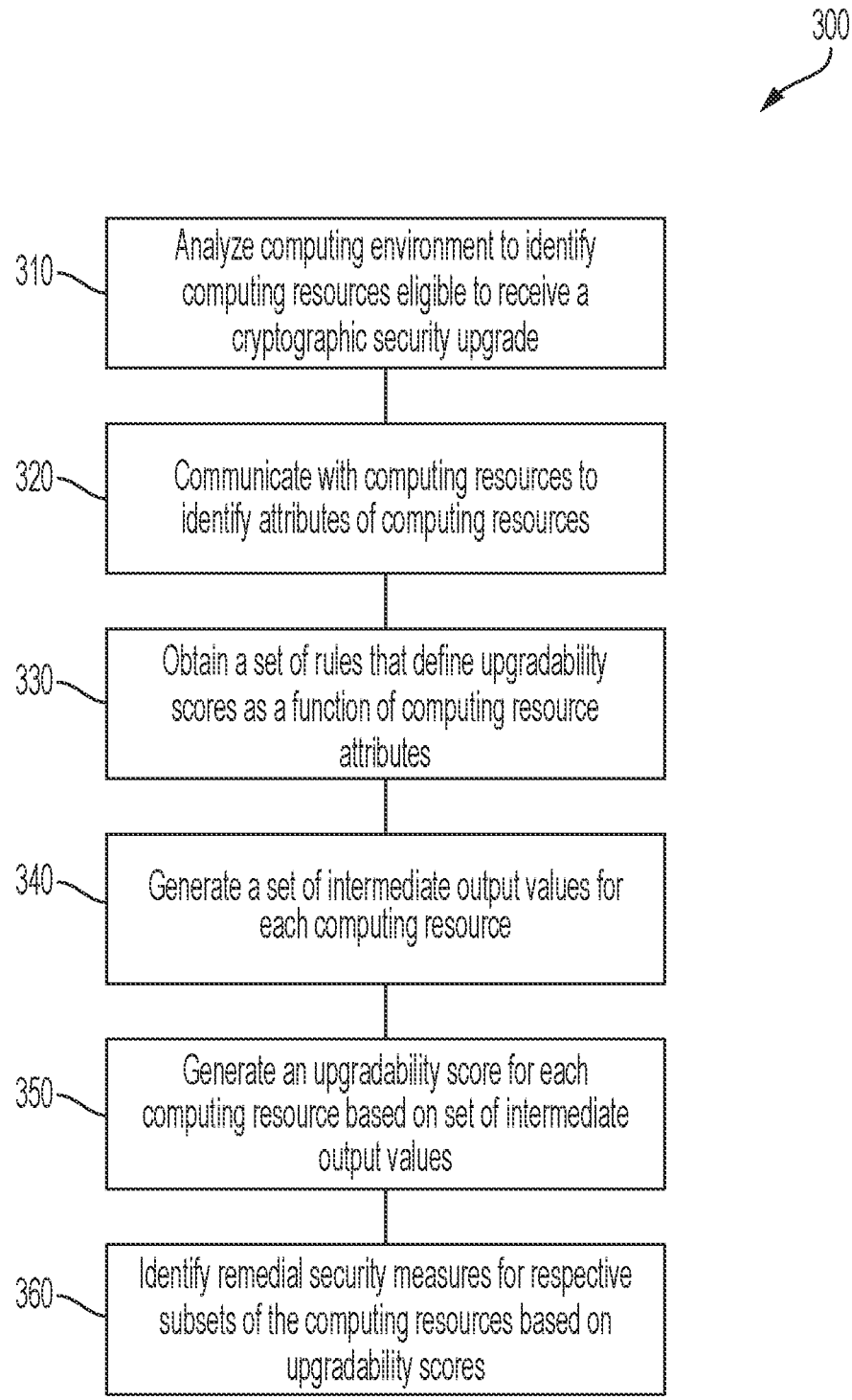
FIG. 3 is a flowchart showing an example process of determining an upgradability score for a computing resource and identifying remedial security measures for the computing resource based on the upgradability score.

FIG. 3 is a flowchart showing an example process 300 of determining an upgradability score for a computing resource and identifying remedial security measures for the computing resource based on the upgradability score. The process 300 can be executed by one or more of the computing devices in an enterprise, for example, a device having administrative rights and access to all required input data. For instance, in the context of a cryptographic security upgrade of the computing environment 100 in FIG. 1, the process 300 may be performed by the entity node 102, which may communicate over the network 106 with the other nodes to collect information on computing resources in the computing environment 100.

The process 300 may be executed on all deployed computing environments in an organization and may performed to improve the cryptographic security in a computing environment (e.g., the computing environment). In some instances, depending on the extent of upgradability and the number of dependencies that need to be upgraded, the cryptographic agility of a computing resource can range from an easy (or fast) cryptographic security upgrade, to a hard (or slow) cryptographic security upgrade, and to a cryptographic security upgrade that is impossible. Obtaining such data before the cryptographic security upgrade can improve enterprise system continuity in the context of a security upgrade, and reduce exposure to risks, costs and delays. In some instances, computing resources that rely on substantially self-contained cryptographic functionalities can be upgraded faster than computing resources that rely on shared system libraries that provide cryptographic functionalities, since shared system libraries can impact other computing resources. Furthermore, in instances where a new shared libraries requires a new OS or new hardware, the upgradability score for the computing resource can indicate the difficulty of the cryptographic security upgrade of the computing resource. In some instances, the cryptographic security upgrade is, or includes, an upgrade from a quantum-vulnerable cryptosystem to a quantum-secure cryptosystem (e.g., having or using a quantum-secure cryptographic library). Consequently, the example process 300 can be performed prior to upgrading to the quantum-secure cryptosystem to determine the upgradability score for a computing resource and identify remedial security measures for the computing resource based on the upgradability score.

At 310, a computing environment (e.g., computing environment 100 in FIG. 1) is analyzed to identify computing resources that are eligible to receive a cryptographic security upgrade. In some instances, the computing environment can be analyzed by processing information stored in an IT database, by monitoring or pinging devices on a network, etc.

At 320, attributes of the computing resources (e.g., some or all of those identified at 310) are identified. For example, the attributes may be identified by communicating (e.g., directly or indirectly) with one or more of the computing resources. In some cases, attributes are identified by the example process 400 shown in FIG. 4, or another type of process may be used. In some instances, the attributes of the computing resources can include one or more of the following: (1) whether an application is capable of being upgraded; (2) whether an existing cryptographic library of the computing resource is statically linked or dynamically linked to the application; (3) whether the existing cryptographic library of the computing resource is shared by at least one other application of the computing resource; (4) whether an operating system upgrade is needed for an operating system of the computing resource to support a new cryptographic library; (5) whether the operating system of the computing resource is capable of being upgraded to support the new cryptographic library; or (6) whether a hardware upgrade is needed for the computing resource to support the new cryptographic library. A combination of these and other attributes can be identified, for example, depending on the nature of the cryptographic upgrade and other considerations.

In some instances, attributes of the computing resources are identified by examining information about encrypted communication on a network (e.g., an enterprise network), including source/destination host:port. Attributes of a host can be identified by remotely executed scripts to determine the application communicating on a given port. Attributes of an application can be identified by determining its cryptographic configuration and cryptographic provider. Attributes of a cryptographic provider can be identified by analyzing its dependencies as well as other applications depending on it. Attributes of an operating system can be identified by analyzing its libraries and determining the libraries that are required for providing cryptographic functionality. Attributes of a hardware computing resource the operating system is running on can be identified by analyzing for compatibility with potential operating system updates.

In some instances, the attributes of the computing resource are identified by relying on a knowledge database regarding the computing environment. In some instances, since the knowledge database may be subjective or outdated, the reliance on a knowledge database can be factored into the resulting upgradability score. In other instances, however, the attributes of the computing resource, and information about encrypted communication on a network, are identified by analyzing packet capture information gathered from a central point on a network (e.g., the network 106 in FIG. 1). For example, the attributes of the computing resource can be identified by connecting to a Network Test Access Point (TAP) or Switch Port Analyzer (SPAN). In some instances, packet capture information can provide the source/destination Internet Protocol (IP) address and port numbers. By analyzing the session handshake messages, an existing cryptographic protocol can be determined, including its version and the cryptographic algorithms (e.g., the existing cryptographic library) negotiated for the session. In some instances, packet capture information may be reflected in Packet Capture (PCAP) files, and software tools (e.g., Wireshark) can be used to analyze the PCAP files to identify attributes of the computing resource.

In some instances, once the IP address and the port are known, command-line scripts can be run and, if needed, executed remotely, to identify attributes of the computing resource. For example, commands like the 'lsof' command can be run on a Linux machine to determine what process is using the port that was detected, and the application binary that started the process can then be determined. In some instances, when the 'lsof' command is not available, the 'proc' file system can be explored to determine the same information.

In some instances, once the name and the location of the application binary have been determined, its name, file path, and registry entries can be analyzed (e.g., on a Windows machine) to determine what security is configured. In some implementations, configuration files can be analyzed for other non-Windows operating systems to determine what cryptographic algorithms (including variants and key sizes) are configured to be used. As an example, a web server application may be capable of using a wide variety of cryptographic algorithms, but a system administrator may want to enable some (or alternatively disable some) of these cryptographic algorithms. For example, in a high-compatibility configuration most of the cryptographic algorithms are enabled. Conversely, in a regulated high-security environment, a small subset of the cryptographic algorithms may be enabled, while all others may be disabled.

Figure 4:
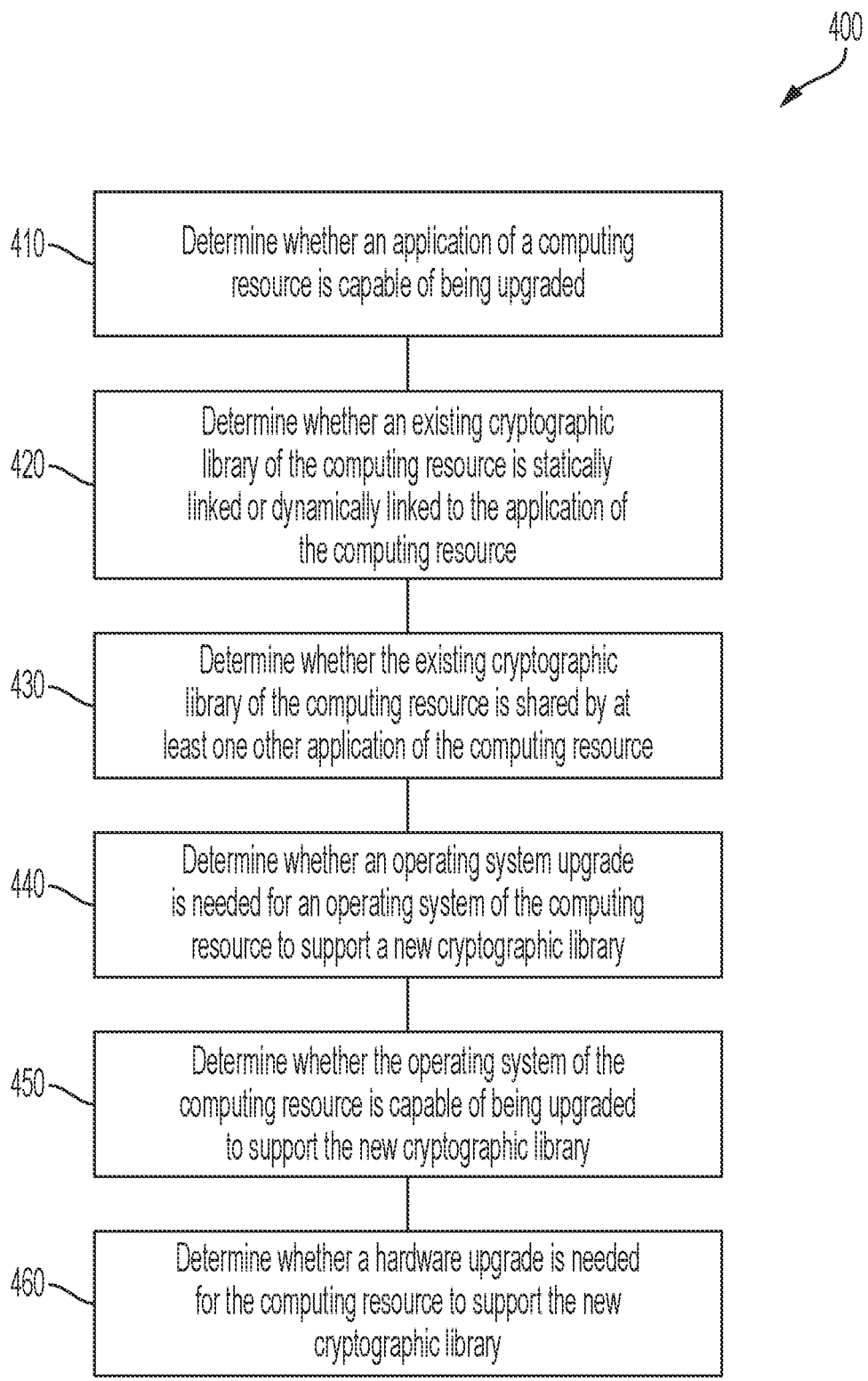
FIG. 4 is a flowchart showing an example process of identifying attributes of a computing resource.

FIG. 4 is a flowchart showing an example process 400 of identifying attributes of a computing resource. The process 400 can be executed by one or more of the computing devices in an enterprise, for example, a device having administrative rights and access to all required input data. For instance, in the context of a cryptographic security upgrade of the computing environment 100 in FIG. 1, the process 400 may be performed by the entity node 102, which may communicate over the network 106 with the other nodes to collect information on computing resources in the computing environment 100. The example operations shown in the example process 400 can be performed by at least one of querying for information systems already deployed within an organization's infrastructure, or executing the operations programmatically by an agent running on target systems where applications of the computing resource reside.

At 410, a determination is made as to whether an application of a computing resource is capable of being upgraded (e.g., in the cryptographic security upgrade). In some instances, the determination made in operation 410 can be made based on a version of the application. In some implementations, a version of the application can be determined by calling the application with a platform-appropriate version flag or checking the Windows registry. In some instances, an application may or may not be capable of being upgraded. This can be due to a variety of factors, examples being that various hardware or software platforms do not support updates after a computing resource (whether a hardware resource, a software resource, or both) leaves the manufacturing facility. In some instances, an application may not be capable of being upgraded since the application is no longer supported in the new, updated, secure cryptosystem.

At 420, a determination is made as to whether an existing cryptographic library of the computing resource is statically linked or dynamically linked to the application. In some instances of operation 420, the existing cryptographic library that the application depends on can be determined, for example, by running the *7dd* command on a Linux machine. In some implementations of a computing environment, dynamically linked cryptographic libraries have their symbols visible so that dependent applications can call APIs when the applications are running. Consequently, these symbols can be analyzed to determine which existing cryptographic library provides cryptographic APIs. If no symbols related to cryptographic functions are found, it may be assumed that the existing cryptographic library used by the application is statically linked. In a statically linked cryptographic library, the application has no external dependencies for cryptography, which in turn indicates that the application binary itself needs to be upgraded in the cryptographic security upgrade, and no shared libraries need to be upgraded in the cryptographic security upgrade.

At 430, a determination is made as to whether the existing cryptographic library of the computing resource is shared by at least one other application of the computing resource. In some instances, the application may be a sole user of the existing cryptographic library; and in such instances, only the application receiving the cryptographic security upgrade needs to be tested (e.g., as in operation 420). However, in other instances, there may be at least one other application relying on the existing cryptographic library for cryptography functionality; and in such instances, the application may not be upgraded until other reliant applications (e.g., applications that share the existing cryptographic library) are tested to ensure such reliant applications function properly with the new cryptographic library associated with the cryptographic security upgrade. For example, if symbols related to cryptographic functions are found for an existing cryptographic library, there may be a need to determine the other application binaries that are using this shared, existing cryptographic library, which may be performed by, for example, running the *7dd* command on a Linux machine on all binaries residing on the computing environment.

At 440, a determination is made as to whether an operating system upgrade is needed for an operating system of the computing resource to support a new cryptographic library. In some instances, in order to upgrade from the existing cryptographic library to the new cryptographic library, an operating system (OS) upgrade may need to be performed. An OS upgrade can impact all the applications running on the computing resource and, possibly, all computing resources of a particular computing environment. In some instances, common cryptography providers can create a common knowledge database, which identifies OS dependencies and runtime libraries of various cryptographic libraries. When a new runtime library is needed, for example, to run the new cryptographic library, the common knowledge database can be accessed to determine which OS version or update is required in order to obtain the new runtime library.

At 450, a determination is made as to whether the operating system of the computing resource is capable of being upgraded to support the new cryptographic library. In some implementations, when an OS upgrade is needed (and where the OS is capable of being upgrade), the OS upgrade can be thoroughly tested, with all the applications running on the computing resources being upgraded, with the OS upgrade being carefully planned to minimize operational impact. In some instances, the operating system of the computing resource cannot be upgraded. This can be due to a variety of factors, examples being that various hardware or software platforms do not support updates after a computing resource (whether a hardware resource, a software resource, or both) leaves the manufacturing facility. In some instances, the operating system of the computing resource may not be capable of being upgraded since the operating system is no longer supported in the new, updated, secure cryptosystem.

At 460, a determination is made as to whether a hardware upgrade is needed for the computing resource to support the new cryptographic library. In some instances, operation 460 may relate to the underlying hardware of the computing resource to support the necessary software and OS upgrades for the cryptographic security upgrade. If any hardware upgrades are needed, these can take a longer time than software and OS upgrades by themselves. In some instances, the determination at 460 can be made by identifying the underlying hardware configuration to determine if the current hardware can support a newer OS. In some instances, the determination at 460 can be made by obtaining information from database systems that manage computing resources for an organization. A common list (e.g., that identifies hardware platforms that do not support application upgrades and applications that are no longer supported) can be maintained in the database systems, and this common list can be accessed to obtain this information and make the determination at 460.

Referring to FIG. 3, at 330, a set of rules are obtained that define upgradability scores as a function of the computing resource attributes (e.g., that are identified at 320). The set of rules may be obtained, for example, in the form of a program or computer code. In some instances, the set of rules can be implemented as logic that can be represented by a table stipulating rules of a particular type. FIG. 5 is a diagram showing an example table 500 illustrating an example set of rules as a function of computing resource attributes. The table 500 includes rows 510 and 520-1 to 520-14, and columns 530-1 to 530-8. Entries of the table 500 in row 510 and columns 530-1 to 530-6 show the respective computing resource attributes (e.g., that are identified at 320). Column 530-1 illustrates a first rule that defines a first output value (e.g., entries of table 500 in column 530-1 in rows 520-1 to 520-14). Column 530-2 illustrates a second rule that defines a second output value (e.g., entries of table 500 in column 530-2 in rows 520-1 to 520-14). Column 530-3 illustrates a third rule that defines a third output value (e.g., entries of table 500 in column 530-3 in rows 520-1 to 520-14). Column 530-4 illustrates a fourth rule that defines a fourth output value (e.g., entries of table 500 in column 530-4 in rows 520-1 to 520-14). Column 530-5 illustrates a fifth rule that defines a fifth output value (e.g., entries of table 500 in column 530-5 in rows 520-1 to 520-14). Column 530-6 illustrates a sixth rule that defines a sixth output value (e.g., entries of table 500 in column 530-6 in rows 520-1 to 520-14).

Referring to FIG. 3, at 340, a set of intermediate output values is generated for each computing resource by applying the set of rules (e.g., shown in FIG. 5) to the computing resource attributes (e.g., that are identified at 320). Rows 520-1 to 520-14 of FIG. 5 shows respective sets of intermediate output values that can be generated for each of the computing resources. Each set of intermediate output values (e.g., values in a respective row 520-1 to 520-14) includes an associated first output value, an associated second output value, an associated third output value, an associated fourth output value, an associated fifth output value, and an associated sixth output value. Although the example intermediate output values in the table 500 are shown as text in FIG. 5, the intermediate output values can be implemented as numerical values (e.g., integer or floating point), Boolean values or another data format.

The associated first output value (e.g., value indicated in column 530-1 of a respective row 520-1 to 520-14) is indicative of whether an application of a computing resource is capable of being upgraded (e.g., at 410 in FIG. 4). In some instances, the first output value can be indicated as "Yes" (indicating that the application can be upgraded and shown in FIG. 5 as Y) or "No" (indicating that the application cannot be upgraded and shown in FIG. 5 as N). The cryptographic security upgrade can be, or include, an upgrade from a quantum-vulnerable cryptosystem to a quantum-secure cryptosystem (e.g., having or using a quantum-secure cryptographic library). In such instances, the first output value may indicate whether the application of the computing resource is capable of being upgraded to use the quantum-secure cryptographic library.

The associated second output value (e.g., value indicated in column 530-2 of a respective row 520-1 to 520-14) is indicative of whether an existing cryptographic library of the computing resource is statically linked or dynamically linked to the application (e.g., at 420 in FIG. 4). In some instances, the second output value can be indicated as "Static" (indicating a statically linked library and shown in FIG. 5 as S), "Dynamic" (indicating a dynamically linked library and shown in FIG. 5 as D), or "N/A" (indicating a "Not Applicable" result and shown in FIG. 5 as N/A).

The associated third output value (e.g., value indicated in column 530-3 of a respective row 520-1 to 520-14) is indicative of whether the existing cryptographic library of the computing resource is shared by at least one other application of the computing resource (e.g., at 430 in FIG. 4). In some instances, the third output value can be indicated as "Yes" (indicating a shared existing cryptographic library and shown in FIG. 5 as Y), "No" (indicating an existing cryptographic library that isn't shared and shown in FIG. 5 as N), or "N/A" (indicating a "Not Applicable" result and shown in FIG. 5 as N/A). The cryptographic security upgrade can be, or include, an upgrade from a quantum-vulnerable cryptosystem to a quantum-secure cryptosystem (e.g., having or using a quantum-secure cryptographic library). In such instances, the third output value may indicate whether at least one other application of the computing resource is impacted by the upgrade from a quantum-vulnerable cryptographic library to the quantum-secure cryptographic library.

The associated fourth output value (e.g., value indicated in column 530-4 of a respective row 520-1 to 520-14) is indicative of whether an operating system upgrade is needed for an operating system of the computing resource to support a new cryptographic library (e.g., at 440 in FIG. 4). In some instances, the fourth output value can be indicated as "Yes" (indicating that an OS upgrade is needed and shown in FIG. 5 as Y), "No" (indicating that an OS upgrade is not needed and shown in FIG. 5 as N), or "N/A" (indicating a "Not Applicable" result and shown in FIG. 5 as N/A).

The associated fifth output value (e.g., value indicated in column 530-5 of a respective row 520-1 to 520-14) is indicative of whether the operating system of the computing resource is capable of being upgraded to support the new cryptographic library (e.g., at 450 in FIG. 4). In some instances, the fifth output value can be indicated as "Yes" (indicating that the OS is capable of being upgraded and shown in FIG. 5 as Y) or "No" (indicating that the OS is not capable of being upgraded and shown in FIG. 5 as N).

The associated sixth output value (e.g., value indicated in column 530-6 of a respective row 520-1 to 520-14) is indicative of whether a hardware upgrade is needed for the computing resource to support the new cryptographic library (e.g., at 460 in FIG. 4). In some instances, the sixth output value can be indicated as "Yes" (indicating that a hardware upgrade is needed and shown in FIG. 5 as Y), "No" (indicating that a hardware update is not needed and shown in FIG. 5 as N), or "N/A" (indicating a "Not Applicable" result and shown in FIG. 5 as N/A).

Referring to FIG. 3, at 350, an upgradability score is generated for each of the computing resources based on the respective set of intermediate output values. For example, FIG. 5 shows respective upgradability scores (e.g., indicated in column 530-7 in rows 520-1 to 520-14) for the respective sets of intermediate output values. In the example shown in FIG. 5, the upgradability score can be in a range from 1 to 10, where 1 indicates the least crypto-agile system (e.g., the most difficult cryptographic security upgrade) and 10 indicates the most crypto-agile system (e.g., the easiest cryptographic security upgrade). Another range of values, or other types of values, can be used to represent the upgradability scores.

In some instances, when the computing resource is provided an upgradability score of 10 in the example shown in FIG. 5, the computing resource has the simplest path to cryptographic security upgrade. In some examples, an upgradability score of 10 may still take, for example, a month or two to perform the upgrade due to an organization's IT procedures, but an upgradability score of 10 corresponds to the fastest possible time for the cryptographic security upgrade. Conversely, in some instances, when the computing resource is provided an upgradability score of 1 in the example shown in FIG. 5, the cryptographic security upgrade for the computing resource may not be possible because, for example, the application of the computing resource is no longer supported or the hardware that it runs on does not support updates. In other examples, another scale may be used, or the indication reversed (e.g., where 10 indicates the least crypto-agile system, and 1 indicates the most crypto-agile system). In the example shown in FIG. 5, an upgradability score of 6 is not used, to increase the difference between upgrade scenarios that require software upgrades only and upgrade scenarios that require both software upgrades and hardware upgrades.

Referring to FIG. 3, at 360, remedial security measures are identified for respective subsets of the computing resources based on the upgradability scores. For example, FIG. 5 shows respective remedial security measures (e.g., indicated in column 530-8 in rows 520-1 to 520-14) for the respective upgradability scores.

In the example shown in FIG. 5, the remedial measure in column 530-8, row 520-1 is a first remedial security measure for a first subset of the computing resources. As discussed in further detail below, the first remedial security measure, associated with an upgradability score of 10 in this example, indicates the need for compatibility testing of only the application being upgraded on the first subset of the computing resources.

As seen in row 520-1 of the example table 500 in FIG. 5, an upgradability score of 10 may indicate the easiest, most agile cryptographic security upgrade. Here, the application of the computing resource is using either a statically linked existing cryptographic library or a dynamically linked existing cryptographic library, where no other application on the computing resource uses the existing cryptographic library. Another feature of this upgradability score is that the cryptographic security upgrade does not require any underlying OS or hardware upgrades. This upgradability score may be associated with a remedial security measure that indicates that only the application itself needs to be tested for compatibility with the new cryptographic library associated with the cryptographic security upgrade, and that no compatibility testing may be required of any other applications (e.g., since no other applications share the existing cryptographic library).

In the example shown in FIG. 5, the remedial measure in column 530-8, row 520-2 is a second remedial security measure for a second subset of the computing resources. As discussed in further detail below, the second remedial security measure, associated with an upgradability score of 9 in this example, indicates the need for compatibility testing of other applications relying on the same cryptographic library on the second subset of computing resources.

As seen in row 520-2 of the example table 500 in FIG. 5, an upgradability score of 9 may indicate that the application of the computing resource is using a dynamically linked existing cryptographic library, where other applications of the computing resource use the dynamically linked existing cryptographic library. Another feature of this upgradability score is that the cryptographic security upgrade does not require any underlying OS or hardware upgrades. This upgradability score may be associated with a remedial security measure that indicates that when updating the application of the computing resource, an IT admin may need to ensure that the other applications can continue working with the new cryptographic library associated with the cryptographic security upgrade. Stated differently, the remedial security measure may indicate that the compatibility of the other applications with the new cryptographic library needs to be tested. Most software can be written in a way to support backward compatibility, so other applications can, theoretically, continue working with the new cryptographic library, but this remedial security measure still needs to be taken to ensure proper planning and determination of risks, costs, and schedules for the cryptographic security upgrade.

In the example shown in FIG. 5, the remedial measure in column 530-8, row 520-3 is a third remedial security measure for a third subset of the computing resources. As discussed in further detail below, the third remedial security measure, associated with an upgradability score of 8 in this example, indicates that operating system resources need to be upgraded before upgrading applications on the third subset of computing resources.

As seen in row 520-3 of the example table 500 in FIG. 5, an upgradability score of 8 may indicate that the application of the computing resource is using either a statically linked existing cryptographic library or a dynamically linked existing cryptographic library, where no other application on the computing resource uses the existing cryptographic library. However, in contrast to an upgradability score of 10, an upgradability score of 8 may indicate that the underlying OS may require an upgrade. This upgradability score may be associated with a remedial security measure that indicates that the underlying OS needs to be upgraded before upgrading the application itself. Upgrading the underlying OS may require OS patch testing (also referred to as OS patching); consequently, remedial security measure associated with an upgradability score of 8 may take longer than the remedial security measure associated with an upgradability score of 9 or 10. Furthermore, the OS patching may occur in batches, which needs to be scheduled in advance, thus increasing the time needed for the cryptographic security upgrade.

In the example shown in FIG. 5, the remedial measure in column 530-8, row 520-4 is a fourth remedial security measure for a fourth subset of the computing resources. As discussed in further detail below, the fourth remedial security measure, associated with an upgradability score of 7 in this example, indicates that operating system resources need to be upgraded, followed by compatibility testing of other applications relying on the same cryptographic library, followed by an upgrade of the application itself on the fourth subset of computing resources.

As seen in row 520-4 of the example table 500 in FIG. 5, an upgradability score of 7 may indicate that the application of the computing resource is using a dynamically linked existing cryptographic library, where other applications of the computing resource use the dynamically linked existing cryptographic library. Another feature of this upgradability score is that the cryptographic security upgrade may require an underlying OS upgrade. This upgradability score may be associated with a remedial security measure that indicates that the underlying OS needs to be upgraded first, followed by a compatibility testing of all other applications that depend on the shared dynamically linked existing cryptographic library, followed by the upgrading of the application itself. Consequently, when updating the application of the computing resource, an IT admin may need to ensure that the other dependent applications can continue working with the new cryptographic library associated with the cryptographic security upgrade. Most software can be written in a way to support backward compatibility, so other applications can, theoretically, continue working with the new cryptographic library, but this determination still needs to be made to ensure proper planning and determination of risks, costs, and schedules for the cryptographic security upgrade. Consequently, in addition to testing the other dependent applications, the OS patching may need to be scheduled and performed.

In the example shown in FIG. 5, the remedial measure in column 530-8, row 520-5 is a fifth remedial security measure for a fifth subset of the computing resources. As discussed in further detail below, the fifth remedial security measure, associated with an upgradability score of 5 in this example, indicates that hardware and operating system resources need to be upgraded before upgrading applications on the fifth subset of computing resources.

As seen in row 520-5 of the example table 500 in FIG. 5, an upgradability score of 5 may indicate that the underlying hardware and OS may need to be upgraded to upgrade the application, but no other application on the computing resource uses the existing cryptographic library. This upgradability score may be associated with a remedial security measure that indicates that the underlying hardware and OS may need to be updated before upgrading the application itself.

In the example shown in FIG. 5, the remedial measure in column 530-8, row 520-6 is a sixth remedial security measure for a sixth subset of the computing resources. As discussed in further detail below, the sixth remedial security measure, associated with an upgradability score of 4, indicates that hardware and operating system resources need to be upgraded, followed by compatibility testing of other applications relying on the same cryptographic library, followed by an upgrade of the application itself on the sixth subset of computing resources.

As seen in row 520-6 of the example table 500 in FIG. 5, an upgradability score of 4 may indicate that the application of the computing resource is using a dynamically linked existing cryptographic library, where other applications of the computing resource use the dynamically linked existing cryptographic library, and where the underlying hardware and OS may need to be upgraded to upgrade the application. This upgradability score may be associated with a remedial security measure that indicates that the underlying hardware and OS need to be upgraded first, followed by a compatibility testing of all other applications that depend on the shared dynamically linked existing cryptographic library, followed by the upgrading of the application itself.

In the example shown in FIG. 5, the remedial measure in column 530-8, row 520-7 is a seventh remedial security measure for a seventh subset of the computing resources. As discussed in further detail below, the seventh remedial security measure, associated with an upgradability score of 3, indicates that operating system (e.g., firmware) resources need to be upgraded before upgrading applications on the seventh subset of computing resources.

As seen in row 520-7 of the example table 500 in FIG. 5, an upgradability score of 3 may indicate that the application and underlying OS are upgradable. This upgradability score may be associated with a hardware resource (e.g., a printer) that may have firmware upgrade capability, but the firmware update may need to be provided by a manufacturer of the hard resource. Therefore, this upgradability score may be associated with a remedial security measure that indicates the firmware update needs to be obtained from the manufacturer of the computing resource, followed by the upgrading of the application itself.

In the example shown in FIG. 5, the remedial measure in column 530-8, rows 520-8 and 520-9 is an eighth remedial security measure for an eighth subset of the computing resources. As discussed in further detail below, the eighth remedial security measure, associated with an upgradability score of 2 in this example, indicates that the applications can be retired and the hardware resources can be upgraded on the eighth subset of computing resources.

As seen in rows 520-8 and 520-9 of the example table 500 in FIG. 5, an upgradability score of 2 may indicate that the application of the computing resource cannot be updated, but the underlying hardware is capable of quantum-safe cryptography (indicated in FIG. 5 as QSC), for example, by supporting an agent (e.g., a VPN or proxy) that can provide a quantum-safe tunnel to protect quantum-vulnerable traffic. Therefore, this upgradability score may be associated with a remedial security measure that indicates the applications can be retired and the hardware resources can be upgraded (e.g., so that the computing resource is provided with a VPN or proxy that can provide a quantum-safe tunnel to protect quantum-vulnerable traffic).

In the example shown in FIG. 5, the remedial security measure in column 530-8, rows 520-10 to 520-14 is a ninth remedial security measure for a ninth subset of the computing resources. As discussed in further detail below, the ninth remedial security measure, associated with an upgradability score of 1 in this example, indicates the retiring of the ninth subset of computing resources.

As seen in row 520-10, 520-11, 520-12, 520-13, and 520-14 of the example table 500 in FIG. 5, an upgradability score of 1 indicates that the application of the computing resource cannot be updated, for example, because the application is no longer supported or because the hardware the application is running on does not support updates. Therefore, this upgradability score may be associated with a remedial security measure that indicates that the computing resource needs to be retired.

In some instances, after the upgradability scores are determined and the remedial security measures are identified for the computing resource in a computing environment, a report may be generated that associates of the computing resources with one or more of the remedial security measures. In some instances where a computing environment includes multiple computing resources, each having a respective upgradability score, an upgradability score of the computing environment can be determined based on the upgradability scores of the multiple computing resources. In some implementations, the upgradability score of the computing environment can be an average of the upgradability scores of the multiple computing resources. Furthermore, one or more of the remedial security measures identified may be initiated (e.g., thus commencing the cryptographic security upgrade). In a corporate environment, initiation of one or more of the remedial security measures may include testing out the cryptographic security upgrade in a sandbox or with a small set of test devices (e.g., within the IT department itself). Once the testing is completed, application and OS updates may be pushed to the corporate environment using automated tools. Most enterprises rely on device management tools to distribute updates. The applications themselves may have an automatic update functionality enabled and can self-update once an update is available. Furthermore, some vendors that provide OS software provide tools to update corporately managed devices running instances of the OS. In some instances, third-party asset management tools that provide a more unified update capability across a number of devices and operating systems may be used. For some systems, updates may be manually applied.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, upgradability scores are determined, and remedial security measures are identified in a computing environment.

In a first example, a computing environment is analyzed to identify computing resources that are eligible to receive a cryptographic security upgrade. The computing resources are communicated with to identify attributes of the computing resources. A set of rules, that define upgradability scores as a function of computing resource attributes, is obtained. Sets of intermediate output values are generated for the respective computing resources by applying the set of rules to the identified attributes of the respective computing resources. Upgradability scores are generated for the respective computing resources from the set of intermediate output values for the respective computing resource. Remedial security measures are identified for respective subsets of the computing resources based on the upgradability scores for the respective subsets.

Implementations of the first example may include one or more of the following features. The set of intermediate output values for each respective computing resource includes: a first output value generated by applying a first rule to the identified attributes of the respective computing resource, where the first rule defines the first output value according to whether an application of the respective computing resource is capable of being upgraded; a second output value generated by applying a second rule to the identified attributes of the respective computing resource, where the second rule defines the second output value according to whether an existing cryptographic library of the respective computing resource is statically linked or dynamically linked to the application of the respective computing resource; a third output value generated by applying a third rule to the identified attributes of the respective computing resource, where the third rule defines the third output value according to whether the existing cryptographic library of the respective computing resource is shared by at least one other application of the respective computing resource; a fourth output value generated by applying a fourth rule to the identified attributes of the respective computing resource, where the fourth rule defines the fourth output value according to whether an operating system upgrade is needed for an operating system of the respective computing resource to support a new cryptographic library associated with the cryptographic security upgrade; a fifth output value generated by applying a fifth rule to the identified attributes of the respective computing resource, where the fifth rule defines the fifth output value according to whether the operating system of the respective computing resource is capable of being upgraded to support the new cryptographic library; and a sixth output value generated by applying a sixth rule to the identified attributes of the respective computing resource, wherein the sixth rule defines the sixth output value according to whether a hardware upgrade is needed for the respective computing resource to support the new cryptographic library. A different set of rules can be used. In some cases, one or more of these rules (the first, second, third, fourth, fifth, sixth rules listed above) can be omitted from the set of rules; or one or more of the rules may define an output value according to other attributes or different information.

Implementations of the first example may include one or more of the following features. The cryptographic security upgrade includes an upgrade from a quantum-vulnerable cryptosystem to a quantum-secure cryptosystem, where: the quantum-secure cryptosystem includes a quantum-secure cryptographic library; the first rule defines the first output value according to whether the application of the respective computing resource is capable of being upgraded to use the quantum-secure cryptographic library; and the third rule defines the third output value according to whether the at least one other application of the respective computing resource is impacted by the upgrade from a quantum-vulnerable cryptographic library to the quantum-secure cryptographic library. Identifying remedial security measures includes identifying a first remedial security measure for a first subset of the computing resources, and the first remedial security measure includes compatibility testing the application on the first subset of computing resources. Identifying remedial security measures includes identifying a second remedial security measure for a second subset of the computing resources, and the second remedial security measure includes compatibility testing the at least one other application sharing the existing cryptographic library on the second subset of computing resources. Identifying remedial security measures includes identifying a third remedial security measure for a third subset of the computing resources, and the third remedial security measure includes upgrading operating system resources before upgrading applications on the third subset of computing resources. Identifying remedial security measures includes identifying a fourth remedial security measure for a fourth subset of the computing resources, and the fourth remedial security measure includes upgrading operating system resources before compatibility testing the at least one other application sharing the existing cryptographic library, and upgrading applications on the fourth subset of computing resources after the compatibility testing. Identifying remedial security measures includes identifying a fifth remedial security measure for a fifth subset of the computing resources, and the fifth remedial security measure includes upgrading hardware and operating system resources before upgrading applications on the fifth subset of computing resources. Identifying remedial security measures includes identifying a sixth remedial security measure for a sixth subset of the computing resources, and the sixth remedial security measure includes upgrading hardware and operating system resources before compatibility testing the at least one other application sharing the existing cryptographic library, and upgrading applications on the sixth subset of computing resources after the compatibility testing. Identifying remedial security measures includes identifying a seventh remedial security measure for a seventh subset of the computing resources, and the seventh remedial security measure includes upgrading operating system resources before upgrading applications on the seventh subset of computing resources. Identifying remedial security measures includes identifying an eighth remedial security measure for an eighth subset of the computing resources, and the eighth remedial security measure includes upgrading hardware resources and retiring applications on the eighth subset of the computing resources. Identifying remedial security measures includes identifying a ninth remedial security measure for a ninth subset of the computing resources, and the ninth remedial security measure includes retiring the ninth subset of the computing resources. In some implementations, the first example further includes initiating one or more of the remedial security measures in the computing environment. In some implementations, the first example further includes generating a report that associates each of the computing resources with one or more of the remedial security measures.

In some implementations, a computing system includes one or more processors and memory storing instructions that are operable when executed by the one or more processors to perform one or more operations of the first example. In some implementations, a computer-readable medium stores instructions that are operable when executed by a data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be used. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of improving cryptographic security in a computing environment, the method comprising:
analyzing the computing environment to identify computing resources that are eligible to receive a cryptographic security upgrade in a migration from an initial cryptosystem to an upgraded cryptosystem;
communicating with the computing resources to identify attributes of the computing resources;
obtaining a set of rules that define upgradability scores as a function of computing resource attributes;
generating sets of intermediate output values for the respective computing resources by applying the set of rules to the identified attributes of the respective computing resources, the set of intermediate output values for each respective computing resource comprising:
a first output value generated by applying a first rule to the identified attributes of the respective computing resource, wherein the first rule defines the first output value according to whether an application of the respective computing resource is capable of being upgraded;
a second output value generated by applying a second rule to the identified attributes of the respective computing resource, wherein the second rule defines the second output value according to whether an existing cryptographic library of the respective computing resource is dynamically linked to the application of the respective computing resource;
a third output value generated by applying a third rule to the identified attributes of the respective computing resource, wherein the third rule defines the third output value according to whether the existing cryptographic library of the respective computing resource is shared by at least one other application of the respective computing resource;
a fourth output value generated by applying a fourth rule to the identified attributes of the respective computing resource, wherein the fourth rule defines the fourth output value according to whether an operating system upgrade is needed for an operating system of the respective computing resource to support a new cryptographic library associated with the cryptographic security upgrade;
a fifth output value generated by applying a fifth rule to the identified attributes of the respective computing resource, wherein the fifth rule defines the fifth output value according to whether the operating system of the respective computing resource is capable of being upgraded to support the new cryptographic library; and
a sixth output value generated by applying a sixth rule to the identified attributes of the respective computing resource, wherein the sixth rule defines the sixth output value according to whether a hardware upgrade is needed for the respective computing resource to support the new cryptographic library;
generating upgradability scores for the respective computing resources, the upgradability score for each respective computing resource being generated from the set of intermediate output values for the respective computing resource;
identifying remedial security measures for respective subsets of the computing resources based on the upgradability scores for the respective subsets, wherein identifying remedial security measures for respective subsets comprises:
in response to a determination that a first upgradability score for a first subset of the computing resources indicates that the operating system resources need to be upgraded and other applications use the new cryptographic library, identifying first remedial security measures for the first subset of the computing resources, wherein the first remedial security measure comprises upgrading operating system resources followed by compatibility testing of other applications relying on the new cryptographic library before upgrading the application on the first subset of computing resources; and
in response to a determination that a second upgradability score for a second subset of the computing resources indicates that that the hardware and operating system resources need to be upgraded followed by compatibility testing of other applications relying on the existing cryptographic library, identifying second remedial security measures for the second subset of the computing resources, wherein the second remedial security measure comprises upgrading hardware and operating system resources before compatibility testing the at least one other application sharing the existing cryptographic library, and upgrading applications on the second subset of computing resources after the compatibility testing; and
initiating one or more of the remedial security measures in the computing environment.

2. The method of claim 1, wherein:
the cryptographic security upgrade comprises an upgrade from a quantum-vulnerable cryptosystem to a quantum-secure cryptosystem, the quantum-secure cryptosystem comprises a quantum-secure cryptographic library;
the first rule defines the first output value according to whether the application of the respective computing resource is capable of being upgraded to use the quantum-secure cryptographic library; and
the third rule defines the third output value according to whether the at least one other application of the respective computing resource is impacted by the upgrade from a quantum-vulnerable cryptographic library to the quantum-secure cryptographic library.

3. The method of claim 1, wherein identifying remedial security measures comprises identifying a third remedial security measure for a third subset of the computing resources, and the third remedial security measure comprises compatibility testing the application on the third subset of computing resources.

4. The method of claim 3, wherein identifying remedial security measures comprises identifying a third remedial security measure for a third subset of the computing resources, and the third remedial security measure comprises upgrading operating system resources before upgrading applications on the third subset of computing resources.

5. The method of claim 4, wherein identifying remedial security measures comprises identifying a fifth remedial security measure for a fifth subset of the computing resources, and the fifth remedial security measure comprises upgrading hardware and operating system resources before upgrading applications on the fifth subset of computing resources.

6. The method of claim 5, wherein identifying remedial security measures comprises identifying a sixth remedial security measure for a sixth subset of the computing resources, and the sixth remedial security measure comprises upgrading hardware and operating system resources before compatibility testing the at least one other application sharing the existing cryptographic library and upgrading applications on the sixth subset of computing resources after the compatibility testing.

7. The method of claim 6, wherein identifying remedial security measures comprises identifying a seventh remedial security measure for a seventh subset of the computing resources, and the seventh remedial security measure comprises upgrading operating system resources before upgrading applications on the seventh subset of computing resources.

8. The method of claim 7, wherein identifying remedial security measures comprises identifying an eighth remedial security measure for an eighth subset of the computing resources, and the eighth remedial security measure comprises upgrading hardware resources and retiring applications on the eighth subset of the computing resources.

9. The method of claim 1, wherein identifying remedial security measures comprises identifying a ninth remedial security measure for a ninth subset of the computing resources, and the ninth remedial security measure comprises retiring the ninth subset of the computing resources.

10. The method of claim 1, comprising generating a report that associates each of the computing resources with one or more of the remedial security measures.

11. A computer system, comprising:
one or more processors; and
memory storing instructions that are operable when executed by the one or more processors to perform operations comprising:
analyzing the computing environment to identify computing resources that are eligible to receive a cryptographic security upgrade in a migration from an initial cryptosystem to an upgraded cryptosystem;
communicating with the computing resources to identify attributes of the computing resources;
obtaining a set of rules that define upgradability scores as a function of computing resource attributes;
generating sets of intermediate output values for the respective computing resources by applying the set of rules to the identified attributes of the respective computing resources, the set of intermediate output values for each respective computing resource comprising:
a first output value generated by applying a first rule to the identified attributes of the respective computing resource, wherein the first rule defines the first output value according to whether an application of the respective computing resource is capable of being upgraded;
a second output value generated by applying a second rule to the identified attributes of the respective computing resource, wherein the second rule defines the second output value according to whether an existing cryptographic library of the respective computing resource is dynamically linked to the application of the respective computing resource;
a third output value generated by applying a third rule to the identified attributes of the respective computing resource, wherein the third rule defines the third output value according to whether the existing cryptographic library of the respective computing resource is shared by at least one other application of the respective computing resource;
a fourth output value generated by applying a fourth rule to the identified attributes of the respective computing resource, wherein the fourth rule defines the fourth output value according to whether an operating system upgrade is needed for an operating system of the respective computing resource to support a new cryptographic library associated with the cryptographic security upgrade;
a fifth output value generated by applying a fifth rule to the identified attributes of the respective computing resource, wherein the fifth rule defines the fifth output value according to whether the operating system of the respective computing resource is capable of being upgraded to support the new cryptographic library; and
a sixth output value generated by applying a sixth rule to the identified attributes of the respective computing resource, wherein the sixth rule defines the sixth output value according to whether a hardware upgrade is needed for the respective computing resource to support the new cryptographic library;
generating upgradability scores for the respective computing resources, the upgradability score for each respective computing resource being generated from the set of intermediate output values for the respective computing resource;
identifying remedial security measures for respective subsets of the computing resources based on the upgradability scores for the respective subsets, wherein identifying remedial security measures for respective subsets comprises:
in response to a determination that a first upgradability score for a first subset of the computing resources indicates that the operating system resources need to be upgraded and other applications use the new cryptographic library, identifying first remedial security measures for the first subset of the computing resources, wherein the first remedial security measure comprises upgrading operating system resources followed by compatibility testing of other applications relying on the new cryptographic library before upgrading the application on the first subset of computing resources; and
in response to a determination that a second upgradability score for a second subset of the computing resources indicates that that the hardware and operating system resources need to be upgraded followed by compatibility testing of other applications relying on the existing cryptographic library, identifying second remedial security measures for the second subset of the computing resources, wherein the second remedial security measure comprises upgrading hardware and operating system resources before compatibility testing the at least one other application sharing the existing cryptographic library, and upgrading applications on the second subset of computing resources after the compatibility testing; and
initiating one or more of the remedial security measures in the computing environment.

12. The computer system of claim 11, wherein:
the cryptographic security upgrade comprises an upgrade from a quantum-vulnerable cryptosystem to a quantum-secure cryptosystem, the quantum-secure cryptosystem comprises a quantum-secure cryptographic library;
the first rule defines the first output value according to whether the application of the respective computing resource is capable of being upgraded to use the quantum-secure cryptographic library; and
the third rule defines the third output value according to whether the at least one other application of the respective computing resource is impacted by the upgrade from a quantum-vulnerable cryptographic library to the quantum-secure cryptographic library.

13. The computer system of claim 11, wherein identifying remedial security measures comprises identifying a third remedial security measure for a third subset of the computing resources, and the third remedial security measure comprises compatibility testing the application on the third subset of computing resources.

14. The computer system of claim 13, wherein identifying remedial security measures comprises identifying a third remedial security measure for a third subset of the computing resources, and the third remedial security measure comprises upgrading operating system resources before upgrading applications on the third subset of computing resources.

15. The computer system of claim 14, wherein identifying remedial security measures comprises identifying a fifth remedial security measure for a fifth subset of the computing resources, and the fifth remedial security measure comprises upgrading hardware and operating system resources before upgrading applications on the fifth subset of computing resources.

16. The computer system of claim 15, wherein identifying remedial security measures comprises identifying a sixth remedial security measure for a sixth subset of the computing resources, and the sixth remedial security measure comprises upgrading hardware and operating system resources before compatibility testing the at least one other application sharing the existing cryptographic library, and upgrading applications on the sixth subset of computing resources after the compatibility testing.

17. The computer system of claim 16, wherein identifying remedial security measures comprises identifying a seventh remedial security measure for a seventh subset of the computing resources, and the seventh remedial security measure comprises upgrading operating system resources before upgrading applications on the seventh subset of computing resources.

18. The computer system of claim 17, wherein identifying remedial security measures comprises identifying an eighth remedial security measure for an eighth subset of the computing resources, and the eighth remedial security measure comprises upgrading hardware resources and retiring applications on the eighth subset of the computing resources.

19. The computer system of claim 18, wherein identifying remedial security measures comprises identifying a ninth remedial security measure for a ninth subset of the computing resources, and the ninth remedial security measure comprises retiring the ninth subset of the computing resources.

20. The computer system of claim 11, the operations comprising generating a report that associates each of the computing resources with one or more of the remedial security measures.

21. A non-transitory computer-readable medium storing instructions that are operable when executed by data processing apparatus to perform operations comprising:
analyzing the computing environment to identify computing resources that are eligible to receive a cryptographic security upgrade in a migration from an initial cryptosystem to an upgraded cryptosystem;
communicating with the computing resources to identify attributes of the computing resources;
obtaining a set of rules that define upgradability scores as a function of computing resource attributes;
generating sets of intermediate output values for the respective computing resources by applying the set of rules to the identified attributes of the respective computing resources, the set of intermediate output values for each respective computing resource comprising:
a first output value generated by applying a first rule to the identified attributes of the respective computing resource, wherein the first rule defines the first output value according to whether an application of the respective computing resource is capable of being upgraded;
a second output value generated by applying a second rule to the identified attributes of the respective computing resource, wherein the second rule defines the second output value according to whether an existing cryptographic library of the respective computing resource is dynamically linked to the application of the respective computing resource;
a third output value generated by applying a third rule to the identified attributes of the respective computing resource, wherein the third rule defines the third output value according to whether the existing cryptographic library of the respective computing resource is shared by at least one other application of the respective computing resource;
a fourth output value generated by applying a fourth rule to the identified attributes of the respective computing resource, wherein the fourth rule defines the fourth output value according to whether an operating system upgrade is needed for an operating system of the respective computing resource to support a new cryptographic library associated with the cryptographic security upgrade;
a fifth output value generated by applying a fifth rule to the identified attributes of the respective computing resource, wherein the fifth rule defines the fifth output value according to whether the operating system of the respective computing resource is capable of being upgraded to support the new cryptographic library; and
a sixth output value generated by applying a sixth rule to the identified attributes of the respective computing resource, wherein the sixth rule defines the sixth output value according to whether a hardware upgrade is needed for the respective computing resource to support the new cryptographic library;
generating upgradability scores for the respective computing resources, the upgradability score for each respective computing resource being generated from the set of intermediate output values for the respective computing resource;

identifying remedial security measures for respective subsets of the computing resources based on the upgradability scores for the respective subsets, wherein identifying remedial security measures for respective subsets comprises:
- in response to a determination that a first upgradability score for a first subset of the computing resources indicates that the operating system resources need to be upgraded and other applications use the new cryptographic library, identifying first remedial security measures for the first subset of the computing resources, wherein the first remedial security measure comprises upgrading operating system resources followed by compatibility testing of other applications relying on the new cryptographic library before upgrading the application on the first subset of computing resources; and
- in response to a determination that a second upgradability score for a second subset of the computing resources indicates that that the hardware and operating system resources need to be upgraded followed by compatibility testing of other applications relying on the existing cryptographic library, identifying second remedial security measures for the second subset of the computing resources, wherein the second remedial security measure comprises upgrading hardware and operating system resources before compatibility testing the at least one other application sharing the existing cryptographic library, and upgrading applications on the second subset of computing resources after the compatibility testing; and initiating one or more of the remedial security measures in the computing environment.

22. The non-transitory computer-readable medium of claim 21, wherein:
- the cryptographic security upgrade comprises an upgrade from a quantum-vulnerable cryptosystem to a quantum-secure cryptosystem, the quantum-secure cryptosystem comprises a quantum-secure cryptographic library;
- the first rule defines the first output value according to whether the application of the respective computing resource is capable of being upgraded to use the quantum-secure cryptographic library; and
- the third rule defines the third output value according to whether the at least one other application of the respective computing resource is impacted by the upgrade from a quantum-vulnerable cryptographic library to the quantum-secure cryptographic library.

23. The non-transitory computer-readable medium of claim 21, the operations comprising generating a report that associates each of the computing resources with one or more of the remedial security measures.

* * * * *

UNITED STATES PATENT AND TRADEMARK OFFICE
CERTIFICATE OF CORRECTION

PATENT NO. : 11,265,159 B1
APPLICATION NO. : 17/145959
DATED : March 1, 2022
INVENTOR(S) : Truskovsky et al.

It is certified that error appears in the above-identified patent and that said Letters Patent is hereby corrected as shown below:

In the Specification

Column 9, Line 30, Delete "*ldd*" and insert -- '*ldd*' -- therefor

Column 9, Line 64, Delete "*ldd*" and insert -- '*ldd*' -- therefor

In the Claims

Column 22, Line 59, Claim 4, delete "third" and insert -- fourth -- therefor

Column 22, Line 60, Claim 4, delete "third" and insert -- fourth -- therefor

Column 22, Line 61, Claim 4, delete "third" and insert -- fourth -- therefor

Column 22, Line 63, Claim 4, delete "third" and insert -- fourth -- therefor

Column 25, Line 27, Claim 14, delete "third" and insert -- fourth -- therefor

Column 25, Line 28, Claim 14, delete "third" and insert -- fourth -- therefor

Column 25, Line 29, Claim 14, delete "third" and insert -- fourth -- therefor

Column 25, Line 31, Claim 14, delete "third" and insert -- fourth -- therefor

Signed and Sealed this
Twenty-eighth Day of June, 2022

*Katherine Kelly Vidal*

Katherine Kelly Vidal
*Director of the United States Patent and Trademark Office*